(12) United States Patent
Mileti

(10) Patent No.: US 10,857,740 B2
(45) Date of Patent: Dec. 8, 2020

(54) MULTI-LAYER PRODUCT WITH SEALING AREAS OF VARYING SEALING AFFINITIES

(71) Applicant: Robert J. Mileti, Torrington, CT (US)

(72) Inventor: Robert J. Mileti, Torrington, CT (US)

(73) Assignee: Trlby Innovations LLC, Torrington, CT (US)

( * ) Notice: Subject to any disclaimer, the term of this patent is extended or adjusted under 35 U.S.C. 154(b) by 673 days.

(21) Appl. No.: 15/230,092

(22) Filed: Aug. 5, 2016

(65) Prior Publication Data

US 2016/0339631 A1 Nov. 24, 2016

Related U.S. Application Data

(63) Continuation of application No. 12/857,304, filed on Aug. 16, 2010, now abandoned, which is a
(Continued)

(51) Int. Cl.
*B32B 27/32* (2006.01)
*B29C 65/00* (2006.01)
(Continued)

(52) U.S. Cl.
CPC ............ *B29C 66/438* (2013.01); *B29C 65/02* (2013.01); *B29C 65/04* (2013.01); *B29C 65/08* (2013.01); *B29C 65/38* (2013.01); *B29C 65/4815* (2013.01); *B29C 65/5021* (2013.01); *B29C 65/5057* (2013.01); *B29C 65/74* (2013.01); *B29C 66/004* (2013.01); *B29C 66/1122* (2013.01); *B29C 66/3452* (2013.01); *B29C 66/3472* (2013.01); *B29C 66/43* (2013.01); *B29C 66/723* (2013.01); *B29C 66/72523* (2013.01); *B29C 66/73116* (2013.01); *B29C 66/73143* (2013.01); *B29C 66/8511* (2013.01); *B29C 66/919* (2013.01); *B29C 66/91413* (2013.01); *B31B 70/00* (2017.08);
(Continued)

(58) Field of Classification Search
CPC ................................ B29C 65/76; B29C 66/43
USPC ................. 428/315.9; 383/17, 105, 107, 120
See application file for complete search history.

(56) References Cited

U.S. PATENT DOCUMENTS

| | | | |
|---|---|---|---|
| 4,147,827 A | 4/1979 | Breidt, Jr. et al. | |
| 4,594,743 A | 6/1986 | Owen et al. | |

(Continued)

FOREIGN PATENT DOCUMENTS

| | | |
|---|---|---|
| EP | 0345774 A1 | 12/1989 |
| EP | 1033238 A1 | 9/2000 |

(Continued)

*Primary Examiner* — Ellen S Hock
(74) *Attorney, Agent, or Firm* — St. Onge Steward Johnston & Reens, LLC

(57) ABSTRACT

An article of manufacture that has at least three layers of sealable material. There is at least one first seal between at least two of the layers in a first area having a first sealing affinity effected at a first sealing parameter. There is also at least one second seal between at least two more layers, where at least one of these two layers is distinct from the at least two layers joined by the first seal, in a second area having a second sealing affinity effected at a second sealing parameter, where the second sealing parameter is different than the first sealing parameter, thereby allowing for sealing of discrete areas of the article in discrete steps.

20 Claims, 17 Drawing Sheets

Related U.S. Application Data continuation-in-part of application No. 12/511,729, filed on Jul. 29, 2009, now abandoned.

(51) Int. Cl.

| | | |
|---|---|---|
| *B29C 65/04* | (2006.01) | |
| *B29C 65/08* | (2006.01) | |
| *B29C 65/38* | (2006.01) | |
| *B29C 65/74* | (2006.01) | |
| *B29C 65/02* | (2006.01) | |
| *B29C 65/50* | (2006.01) | |
| *B32B 3/08* | (2006.01) | |
| *B29C 65/48* | (2006.01) | |
| *B32B 27/30* | (2006.01) | |
| *B32B 27/08* | (2006.01) | |
| *B32B 5/14* | (2006.01) | |
| *B32B 23/20* | (2006.01) | |
| *B32B 27/34* | (2006.01) | |
| *B32B 27/36* | (2006.01) | |
| *B32B 3/26* | (2006.01) | |
| *B32B 27/28* | (2006.01) | |
| *B32B 23/08* | (2006.01) | |
| *B32B 7/02* | (2019.01) | |
| *B31B 70/00* | (2017.01) | |
| *B32B 7/05* | (2019.01) | |
| *B29L 31/00* | (2006.01) | |
| *B29C 65/18* | (2006.01) | |
| *B31B 160/10* | (2017.01) | |
| *B31B 155/00* | (2017.01) | |
| *B31B 70/64* | (2017.01) | |
| *B29K 23/00* | (2006.01) | |

(52) U.S. Cl.
CPC .............. *B32B 3/08* (2013.01); *B32B 3/266* (2013.01); *B32B 5/142* (2013.01); *B32B 7/02* (2013.01); *B32B 7/05* (2019.01); *B32B 23/08* (2013.01); *B32B 23/20* (2013.01); *B32B 27/08* (2013.01); *B32B 27/283* (2013.01); *B32B 27/304* (2013.01); *B32B 27/306* (2013.01); *B32B 27/32* (2013.01); *B32B 27/322* (2013.01); *B32B 27/34* (2013.01); *B32B 27/365* (2013.01); *B29C 65/18* (2013.01); *B29C 66/71* (2013.01); *B29C 66/83221* (2013.01); *B29C 66/91431* (2013.01); *B29C 66/91641* (2013.01); *B29C 2793/0045* (2013.01); *B29K 2023/065* (2013.01); *B29K 2023/0633* (2013.01); *B29L 2031/7128* (2013.01); *B31B 70/64* (2017.08); *B31B 2155/00* (2017.08); *B31B 2155/002* (2017.08); *B31B 2160/10* (2017.08); *B32B 2250/24* (2013.01); *B32B 2307/204* (2013.01); *B32B 2307/30* (2013.01); *B32B 2307/31* (2013.01); *B32B 2439/00* (2013.01); *Y10T 156/10* (2015.01); *Y10T 156/1056* (2015.01); *Y10T 156/1057* (2015.01); *Y10T 428/1334* (2015.01); *Y10T 428/24744* (2015.01); *Y10T 428/2848* (2015.01)

(56) References Cited

U.S. PATENT DOCUMENTS

| | | |
|---|---|---|
| 4,904,093 A | 2/1990 | Woods et al. |
| 5,484,375 A | 1/1996 | Owensby et al. |
| 5,536,542 A | 7/1996 | Gillespie et al. |
| 5,647,832 A | 7/1997 | Nickell et al. |
| 5,649,767 A | 7/1997 | Nickell et al. |
| 6,996,951 B2 | 2/2006 | Smith et al. |
| 7,976,917 B2 * | 7/2011 | Suzuki ............... B65D 81/3266 428/35.2 |
| 2003/0138347 A1 | 7/2003 | Lin |
| 2006/0083875 A1 | 4/2006 | Weaver |
| 2006/0093765 A1 | 5/2006 | Mueller |
| 2010/0028649 A1 | 2/2010 | Trouilhet et al. |

FOREIGN PATENT DOCUMENTS

| | | |
|---|---|---|
| EP | 2151316 A1 | 2/2010 |
| GB | 2070514 A | 9/1981 |
| GB | 2455949 A | 7/2009 |
| JP | 2002154577 A | 5/2002 |
| JP | 2005144757 A | 6/2005 |

* cited by examiner

MULTI-LAYER PRODUCT WITH SEALING AREAS OF VARYING SEALING AFFINITIES

FIELD OF THE INVENTION

The subject invention relates to products formed of multiple layers of sealable materials. More particularly, the subject invention relates to products formed of multiple layers of sealable materials with distinct sealing affinities that are sealable at different sealing parameters in discrete areas of the product.

BACKGROUND OF THE INVENTION

There are numerous products formed using sealable materials, including pouches and other containers. They are manufactured by heat sealing together different layers of the materials in multiple locations to achieve the various sizes and shapes desired. U.S. Pat. Nos. 5,536,542 and 5,484,375 generally disclose articles created by heat sealing polymeric layers together.

It is often desirable to heat seal a multi-layer product in an area at a given temperature while not affecting one or more of the layers for design or functional reasons. Currently, this is achieved by introducing barrier layers such as paper, treating the layer that is to be protected with a lubricant or paint, or using a mechanical process to prevent a heat seal from occurring between certain layers in that area. This inevitably leads to additional multi-step processes which add time and cost to the manufacturing process. It would be advantageous to effect seals between layers in some areas based on a sealing parameter and in other areas based on a different sealing parameter without the need for additional intermediary steps.

U.S. Pat. No. 6,996,951 discloses a flexible multi-compartment container with peelable seals and a method for making such a container. In one specific embodiment, the container includes multiple layers, with an outer layer having a higher melting temperature than an inner seal layer. U.S. Pat. No. 4,147,827 discloses a method for the production of heat sealable co-extruded films having a high melting point core layer coated on at least one side with a lower melting point skin layer.

Thus, while the above references describe articles created by sealing together multiple layers of material, some of which may have different melting temperatures, none of them discloses, teaches or suggests a product formed of multiple layers that are sealed together wherein, in some areas, the materials forming the product are sealable at a sealing parameter, and in other areas, the materials forming the product are sealable at a different sealing parameter, thereby allowing for sealing of discrete areas of the product in discrete steps.

SUMMARY OF THE INVENTION

It is therefore an object of the present invention to provide an improved process for producing articles formed of multiple layers of sealable material, which accommodates the sealing of discrete areas of the product in discrete steps.

It is a further object of the present invention to provide such an improved process which eliminates the need for intermediary steps within the process to impede sealing between layers in certain areas, where seals are not desired, to make the process more efficient and cost effective.

The subject invention results from the realization, in part, that a more time and cost effective process for producing articles formed of multiple layers of sealable material having distinct sealing affinities can be achieved by providing a process wherein certain layers of the product are sealable at one sealing parameter, and in other areas, certain layers of the product are sealable at a different sealing parameter.

The subject invention, however, in other embodiments, need not achieve all these objectives and the claims hereof should not be limited to structures or methods capable of achieving these objectives.

The subject invention features an article of manufacture comprising at least three layers of sealable material. There is at least one first seal between at least two of the layers in a first area having a first sealing affinity and effected at a first sealing parameter. Also, there is least one second seal between at least two of the layers, wherein at least one of these two layers is distinct in sealing affinity from the two layers joined by the first seal. This second seal is in a second area having a second sealing affinity and is effected at a second sealing parameter that is different than the first sealing parameter, thereby allowing for sealing of discrete areas of the article in discrete steps. In forming the seals on materials having distinct sealing affinities, said first and second sealing parameters may be based on employing various sealing techniques, such as constant temperature, impulse heat sealing, radio frequency (R.F.) heat sealing, also known as dielectric sealing, and/or ultrasonic sealing.

In one example, the at least three layers of sealable material comprise at least one laminate sheet. This sheet comprises a first face of material having a first sealing affinity which is sealable at the first sealing parameter, which may be at a first temperature or correlate to the first sealing affinity, and a second face of material having a second sealing affinity that is sealable at the second sealing parameter, which may be at a second temperature or correlate to the second sealing affinity.

In another example, the article of manufacture is a flexible ported pouch. Here, the least three layers of sealable material comprise two pouch layers with the first seal therebetween and two port layers with the second seal therebetween.

In still another example, the article of manufacture is a dual layer baffle system. In this embodiment, the at least three layers of sealable material comprise two exterior layers connected to a plurality of baffles by a plurality of first seals, and a plurality of two baffle layers with the second seal there between.

In yet another example, the article of manufacture is a core film baffle system. In this embodiment, the at least three layers of sealable material comprise two exterior layers connected to a plurality of core film baffles by a plurality of first seals, and a plurality of two core film baffle layers with the second seal there between.

The subject invention also features a method for forming an article of manufacture. The method comprises the steps of providing at least three layers of sealable material. At least one layer of the at least three layers and at least one opposing layer of the at least three layers are affected at a first sealing parameter in a first area having a first sealing affinity to effect at least one first seal. Then, at least one layer of the at least three layers and at least one opposing layer of the at least three layers are affected at a second sealing parameter, wherein the second sealing parameter is different from the first sealing parameter. This forms at least one second seal in a second area having a second sealing affinity, thereby allowing for sealing of discrete areas of the article in discrete steps. In forming the seals on materials having distinct sealing affinities, said first and second sealing parameters may be based on employing various sealing techniques, such as constant temperature, impulse heat sealing, dielectric sealing, and/or ultrasonic sealing.

In one example of this process, the at least three layers of sealable material comprise at least one laminate sheet. This sheet comprises a first face of material having a first sealing affinity sealable at the first sealing parameter, which may be at a first temperature or correlate to the first sealing affinity, and a second face of material having a second sealing affinity sealable at the second sealing parameter, which may be at a second temperature or correlate to the second sealing affinity.

The subject invention also features a flexible ported pouch with an interior. In an exemplary embodiment, the pouch comprises a first pouch sheet and a second pouch sheet and is formed by a first seal at a first sealing parameter, which may be at a first temperature or correlate to the first sealing affinity, around a periphery of the first and second pouch sheets having a first sealing affinity. This first seal has at least one gap having an opening spaced from the first seal to provide a channel between the first pouch sheet and the second pouch sheet. There is a port that is interposed between the first pouch sheet and the second pouch sheet, and is in communication with the interior of the pouch. This port comprises a first port sheet and a second port sheet, and is formed by a second and third seal along the longitudinal edges, having a second sealing affinity, of the first and second port sheets at a second sealing parameter, which may be at a second temperature wherein the second temperature is higher than the first temperature, or correlate to the second sealing affinity wherein the second sealing affinity is higher or lower than the first sealing affinity. The first and second port sheets are further sealed to the pouch where the first and second port sheets having the first sealing affinity intersect with the periphery of the first and second pouch sheets at the first sealing parameter, which may be at the first temperature or correlate to the first sealing affinity. The difference in sealing parameters correlating to distinct sealing affinities allows the port to be sealed to the pouch without the interior of the port also being sealed. Said first and second sealing parameters may be based on employing various sealing techniques, such as constant temperature, impulse heat sealing, dielectric sealing, and/or ultrasonic sealing.

Also, in the exemplary embodiment of the flexible ported pouch, the first and second port sheets are laminates comprising a first face having a first sealing affinity sealable at a first sealing parameter, which may be at the first temperature or correlate to the first sealing affinity, and a second face having a second sealing affinity sealable at a second sealing parameter, which may be at the second temperature or correlating to the second sealing affinity. The first face forms the exterior of the port. The first face is sealable at sealing parameter at a lower temperature or correlating to a lower or higher sealing affinity so this allows the port to be sealed to the pouch at the point of intersection at the low temperature, the low sealing affinity, or the high sealing affinity while leaving the interior of the port unsealed at this intersection.

In other aspects of the present invention, the flexible pouch configuration can also be achieved by substituting the first and second pouch sheets with a single pouch sheet having a first sealing affinity, folding it over on an axis, and effecting the first seal at a first sealing parameter, which may be at a first temperature or correlate to the first sealing affinity, around the open pouch edges that are formed. Similarly, the flexible port configuration can be achieved by substituting the first and second port sheets with a single port sheet having a second sealing affinity folded about an axis and replacing the second and third seals with a single seal at a second sealing parameter, which may be at a second temperature or correlate to the second sealing affinity, along the open longitudinal edge. The single sheet port configuration can also feature a single port sheet comprising a laminate. This laminate comprises a first face having a first sealing affinity sealable at the first sealing parameter, which may be at the first temperature or correlate to the first sealing affinity, and a second face having a second sealing affinity sealable at the second sealing parameter, which may be at the second temperature or correlate to the second sealing affinity, with the first face forming the exterior of the port. Said first and second sealing parameters may be based on employing various sealing techniques, such as constant temperature, impulse heat sealing, dielectric sealing, and/or ultrasonic sealing.

The subject invention further features a method of manufacturing a flexible ported pouch. The method comprises the steps of providing first and second port sheets of sealable material in parallel. The first and second port sheets are then affected along their longitudinal edges, having a first sealing affinity, at a first sealing parameter, which may be at a first temperature or correlate to the first sealing affinity, to effect a first and second seal to form a port with an exterior and an interior. First and second pouch sheets of sealable material having a second sealing affinity are then provided in parallel. The port is introduced by interposition between the first and second pouch sheets. Finally, a periphery of the first pouch sheet, the second pouch sheet, and the exterior of the port, where the exterior of the port intersects with the periphery of the first and second pouch sheets, are affected by a second sealing parameter. The second sealing parameter, which may be at a second temperature that is lower than the first temperature or correlate to the second sealing affinity that is lower or higher than the first sealing affinity, and effects a third seal without sealing the interior of the port at the intersection of the periphery of the pouch. Said first and second sealing parameters may be based on employing various sealing techniques, such as constant temperature, impulse heat sealing, dielectric sealing, and/or ultrasonic sealing.

The subject method can also be executed by substituting the first and second port sheets with a single port sheet having a first sealing affinity and folding it upon an axis. The open longitudinal edge can then be affected at the first sealing parameter, which may be at the first temperature or correlate to the first sealing affinity to effect a first seal to replace the first and second seals of the exemplary method. Similarly, the first and second pouch sheets can be replaced by a single pouch sheet having a second sealing affinity folded upon an axis and sealed along the open edges at the second sealing parameter, which may be at the second temperature or correlate to the second sealing affinity. Said first and second sealing parameters may be based on employing various sealing techniques, such as constant temperature, impulse heat sealing, dielectric sealing, and/or ultrasonic sealing.

The subject invention also includes a dual layer film baffle system. The exemplary embodiment of the baffle system comprises a first and second sheet of sealable material. There is then a plurality of baffle elements interposed between the first and second sheets having a first sealing affinity. These baffle elements comprise a third sheet of sealable material sealed at a first sealing parameter, which may be at a first temperature or correlate to the first sealing affinity, along one edge, having the first sealing affinity, of the third sheet and latitudinally across the first sheet. A fourth sheet of sealable material is sealed at the first sealing parameter, which may be at the first temperature or correlate to the first sealing affinity, along one edge, having the first sealing affinity, of the fourth sheet and latitudinally across the second sheet. The third and fourth sheets are further sealed together along their common edge, having a second sealing affinity, at a second sealing parameter, which may be at a second temperature wherein the second temperature is higher than the first temperature or correlate to the second sealing affinity wherein the second sealing affinity is higher or lower than the first sealing affinity. Said first and second sealing parameters may be based on employing various sealing techniques, such as constant temperature, impulse heat sealing, dielectric sealing, and/or ultrasonic sealing.

In the exemplary embodiment of the baffle system, the first and second sheets of sealable material are low temperature, low affinity, or high affinity sealing material and the third and fourth sheets of sealable material are laminates comprising a first face having a first sealing affinity of high temperature, high affinity, or low affinity sealing material and a second face having a second sealing affinity of low temperature, low affinity, or high affinity sealing material.

The subject invention also features a method of manufacturing a dual layer baffle system. The method comprises the steps of providing a first and second sheet of sealable material in parallel. The sheets are then affected at a first sealing parameter, which may be at a first temperature or correlate to a first sealing affinity, latitudinally across the first and second sheets, having a first sealing affinity, at a longitudinal interval to effect a plurality of first seals. The first and second sheets are then perforated latitudinally across the sheets at the longitudinal interval effecting a plurality of perforated lines. A third sheet of sealable material having a second sealing affinity is then introduced to the exterior of the first sheet. A fourth sheet of sealable material having the second sealing affinity is then introduced to the exterior of the second sheet. Then, the third sheet, the first sheet, the fourth sheet and the second sheet are affected at a second sealing parameter, which may be at a second temperature wherein the second temperature is lower than the first temperature or correlate to the second sealing affinity wherein the second sealing affinity is lower or higher than the first sealing affinity, latitudinally across the sheets, having the second sealing affinity, at the longitudinal interval, effecting a plurality of second seals between the fourth sheet and the first sheet and a plurality of third seals between the third sheet and the second sheet. Said first and second sealing parameters may be based on employing various sealing techniques, such as constant temperature, impulse heat sealing, dielectric sealing, and/or ultrasonic sealing. Finally, the fourth sheet and third sheet are spread apart, thereby separating the first and second sheets along the perforated lines to effect baffles between the fourth sheet and the third sheet.

The subject invention also includes a core film baffle system. The core film baffle system comprises a first and second sheet of sealable material. There is then a plurality of core film baffle elements interposed between the first and second sheets having a first sealing affinity. These core film baffle elements comprise a third sheet of sealable material sealed at a first sealing parameter, which may be at a first temperature or correlate to a first sealing affinity, along one edge, having a first sealing affinity, of the third sheet and latitudinally across the first sheet. A fourth sheet of sealable material is sealed at the first sealing parameter, which may be at the first temperature or correlate to the first sealing affinity, along one edge, having the first sealing affinity, of the fourth sheet and latitudinally across the second sheet. A fifth sheet of sealable material is interposed between the third sheet and the fourth sheet. Then, the third sheet, the fourth sheet, and the fifth sheet are sealed together along their common edge, having a second sealing affinity, at a second sealing parameter, which may be at a second temperature wherein the second temperature is higher than the first temperature or correlate to the second sealing affinity wherein the second sealing affinity is higher or lower than the first sealing affinity. Said first and second sealing parameters may be based on employing various sealing techniques, such as constant temperature, impulse heat sealing, dielectric sealing, and/or ultrasonic sealing.

Also, in the exemplary embodiments of the core film baffle system, the first and second sheets of sealable material are low temperature, low affinity, or high affinity sealing material, the third and fourth sheets of sealable material are laminates comprising a first face having a first sealing affinity of high temperature, high affinity, or low affinity sealing material and a second face having a second sealing affinity of low temperature, low affinity, or high affinity sealing material, and the fifth sheet is a core sheet of high temperature, high affinity, or low affinity sealing material.

The subject invention further includes a method of manufacturing a core film baffle system. In an exemplary embodiment, the method comprises the steps of providing a first and second sheet of sealable material in parallel. The sheets are perforated latitudinally across the first and second sheets at a longitudinal interval to effect a plurality of perforated lines. Then, a third sheet of sealable material is provided in parallel with the first and second sheets and interposed between said first and second sheets. The sheets are then affected at a first sealing parameter, which may be at a first temperature or correlate to the first sealing affinity, latitudinally across the first, second, and third sheets, having a first sealing affinity, at the longitudinal interval effecting a plurality of first seals. A fourth sheet of sealable material having a second sealing affinity is then introduced to the exterior of the first sheet. A fifth sheet of sealable material having the second sealing affinity is then introduced to the exterior of the second sheet. Then, the fourth sheet, the first sheet, the fifth sheet, and the second sheet are affected at a second sealing parameter, which may be at a second temperature wherein the second temperature is lower than the first temperature or correlate to the second sealing affinity wherein the second sealing affinity is lower or higher than the first sealing affinity, latitudinally across the sheets, having a second sealing affinity, at the longitudinal interval, effecting a plurality of second seals between the fifth sheet and the first sheet and a plurality of third seals between the fourth sheet and the second sheet. Said first and second sealing parameters may be based on employing various sealing techniques, such as constant temperature, impulse heat sealing, dielectric sealing, and/or ultrasonic sealing. Finally, the fifth sheet and fourth sheet are spread apart, thereby separating the first and second sheets along the perforated lines to effect core film baffles between the fifth sheet and the fourth sheet.

In another exemplary embodiment, the subject method can also be executed by substituting the first and second sheets of sealable material provided in parallel with a first and second sheet of pre-perforated sealable material provided in parallel, wherein the perforations are latitudinally across said pre-perforated sheets at a longitudinal interval to effect a plurality of perforated lines. Then, the third sheet of sealable material is provided in parallel with the first and second pre-perforated sheets and interposed between said first and second pre-perforated sheets. These sheets are then affected at a first sealing parameter, which may be at a first temperature or correlate to the first sealing affinity, latitudinally across the first, second, and third sheets, having a first sealing affinity, at the longitudinal interval effecting a plurality of first seals.

BRIEF DESCRIPTION OF THE DRAWINGS

Other objects, features and advantages will occur to those skilled in the art from the following description of an exemplary embodiment and the accompanying drawings, in which.

DETAILED DESCRIPTION OF THE INVENTION

Figure 1:
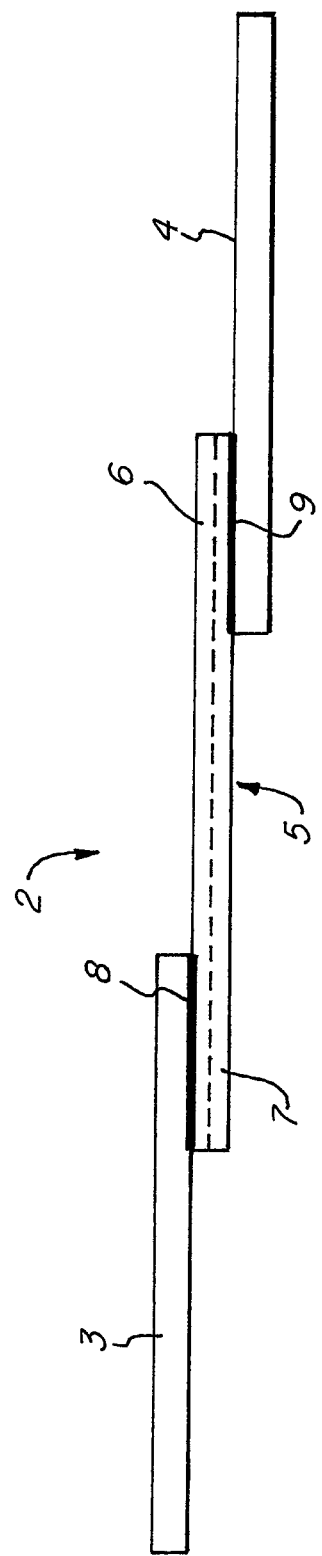
FIG. 1 shows a schematic cross sectional view of an article of manufacture consisting of multiple layers of sealable material having distinct sealing affinities and multiple seals.

Aside from the exemplary embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. Moreover, the claims hereof are not to be read restrictively unless there is clear and convincing evidence manifesting a certain exclusion, restriction, or disclaimer.

In general, the subject invention is sealing multiple layers of material having distinct sealing affinities at different sealing parameters at various locations. A sheet of material may be a laminate and have one face of material, or layer, with a sealing affinity or temperature that is higher than the sealing affinity or temperature of the opposite face of material, or layer. In forming the seals on materials having distinct sealing affinities, the different sealing parameters may be based on employing various sealing techniques, such as constant temperature, impulse heat sealing, radio frequency (R.F.) heat sealing, also known as dielectric sealing, and/or ultrasonic sealing.

One embodiment of the subject invention is article of manufacture 2, FIG. 1. Sheet 5 is laminate where layer 6 and layer 7 are sealable at different sealing parameters. Seal 8 is formed by affecting layer 3 and sheet 5 by applying a first sealing parameter, such as heating the layer 3 and sheet 5 to a first temperature, at which a seal between layer 3 and layer 6 is effected. Seal 9 is formed by affecting layer 4 and sheet 5 by applying a second sealing parameter, such as heating the layer 4 and layer 5 to a second temperature, which is different than the first temperature, and at which a seal between layer 4 and layer 7 is effected. In other embodiments, seals 8 and 9 may be formed at different sealing parameters correlating to distinct sealing affinities of various dielectric materials, which is important for instance when said sheet 5 has at least one dielectric layer, such as acetal copolymer, ethyl vinyl acetate (EVA), cellulose acetate, polyamide (PA), polycarbonate, polyvinyl chloride (PVC), or polyvinylidene chloride (saran).

Figure 2:
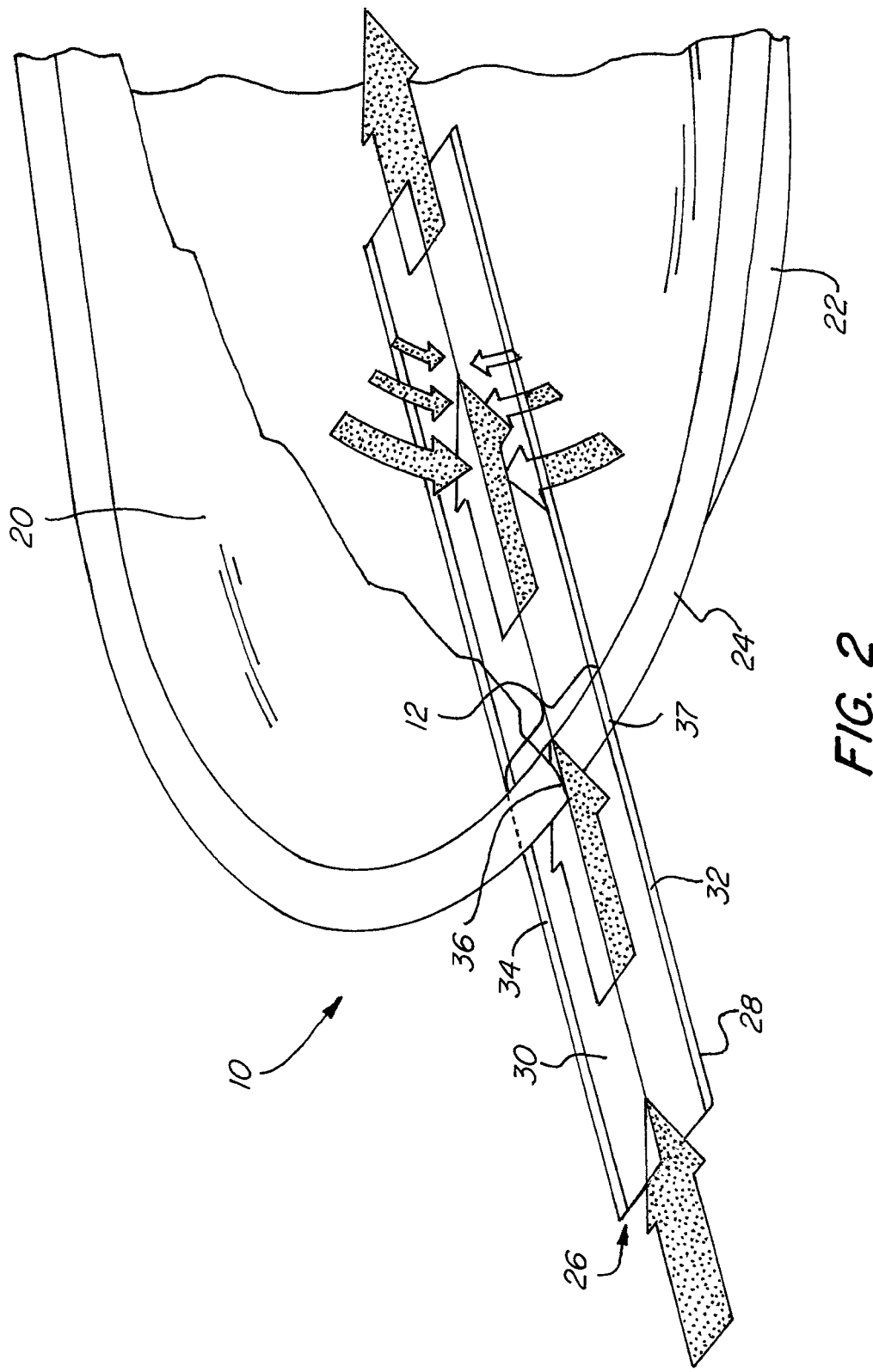
FIG. 2 shows a perspective view of a portion of an assembled flexible ported pouch employing the multiple layers and multiple seals shown in FIG. 1.

In one particular embodiment, flexible ported pouch 10, FIG. 2, has a top pouch sheet 20 and a bottom pouch sheet 22 each made of sealable material. In one exemplary embodiment, the material is Low Density Polyethylene (LDPE) and is sealable between 225-275 degrees F., but other sealing sheets or sealing laminates, such as dielectric sheets or laminates of various size and sealability (dielectric sealing affinity), can be used for the pouch sheets 20 and 22. In some other embodiments, pouch sheets 20 and 22 may be a single sealable sheet or sealable laminate folded about an axis to create top pouch sheet 20 and bottom pouch sheet 22.

Figure 4:
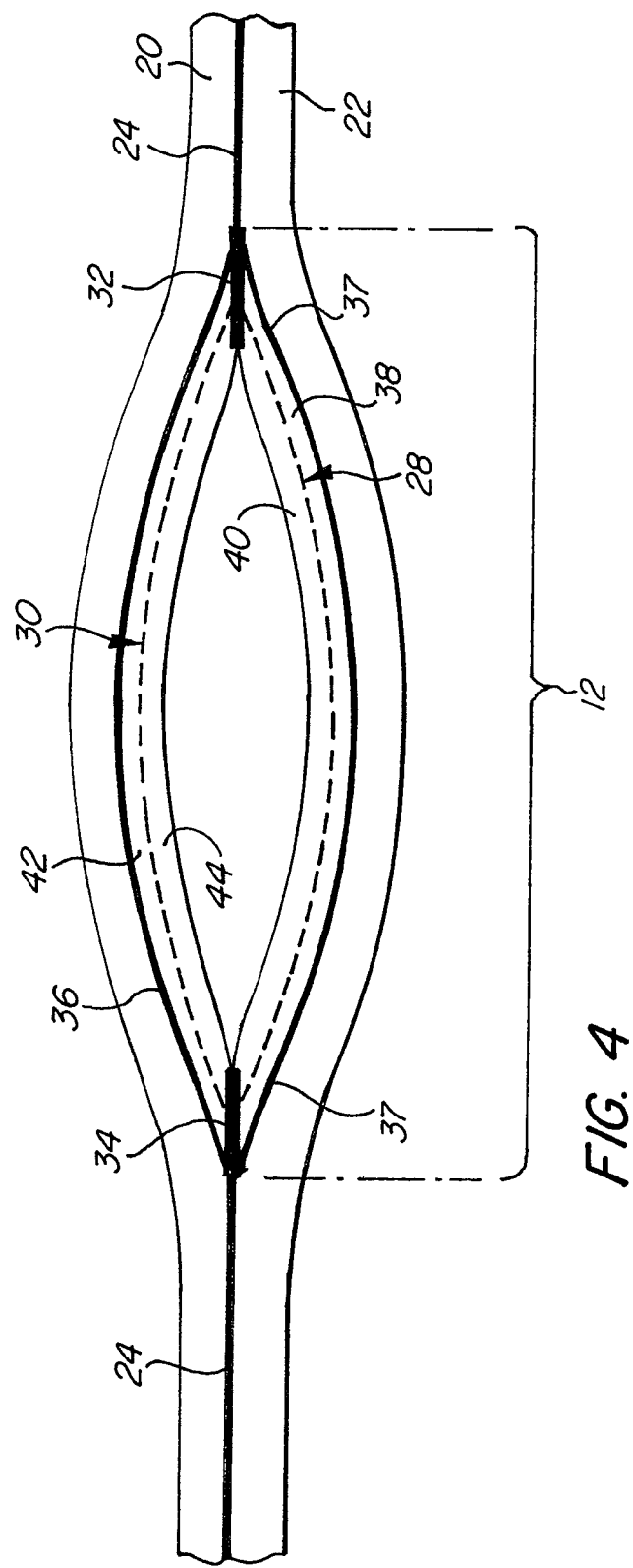
FIG. 4 shows a greatly enlarged schematic cross sectional view of the port opening of the exemplary embodiment of an assembled flexible ported pouch of FIG. 2 wherein the port sheets are laminates.

Port 26, also FIG. 2, has a top port sheet 30 and bottom port sheet 28 each made of sealable material. In the exemplary embodiment in FIG. 4, top port sheet 30 is a laminate having one layer 42 with a low sealing temperature, a low sealing affinity, or a high sealing affinity, and the opposite layer 44 having a high sealing temperature, a high sealing affinity, or a low sealing affinity. Likewise, bottom port sheet 28 is a laminate having one layer 38 with a low sealing temperature, a low sealing affinity, or a high sealing affinity, and the opposite layer 40 having a high sealing temperature, a high sealing affinity, or a low sealing affinity. In this exemplary embodiment, layers 38 and 42 which form the exterior face of port 26 are made of LDPE and are sealable between 225-275 degrees F. while layers 40 and 44 which form the interior of port 26 are made of High Density Polyethylene (HDPE) and are sealable between 325-375 degrees F. Other sealable sheets or sealable laminates, such as dielectric sheets or laminates of various size and sealing affinity, may be used for port sheet 28 and port sheet 30 as long as the interior of port 26 is sealable, at a sealing parameter at a higher temperature, or correlating to a higher or lower sealing affinity, than the sealing parameter of pouch sheets 20 and 22, which may, for example, be a dielectric material having a sealing affinity between highest to zero, such as ethyl cellulose, polypropylene, silicone, or Teflon. This prevents the sealing of the interior of port 26 where it intersects with pouch 10 at gap 12. Port sheet 28 and port sheet 30 may, in other embodiments, be a single sealable sheet or sealable laminate folded about an axis to create top port sheet 30 and bottom port sheet 28. In forming the seals, the different sealing parameters may be based on employing various sealing techniques, such as constant temperature, impulse heat sealing, dielectric sealing, and/or ultrasonic sealing.

Figure 3:
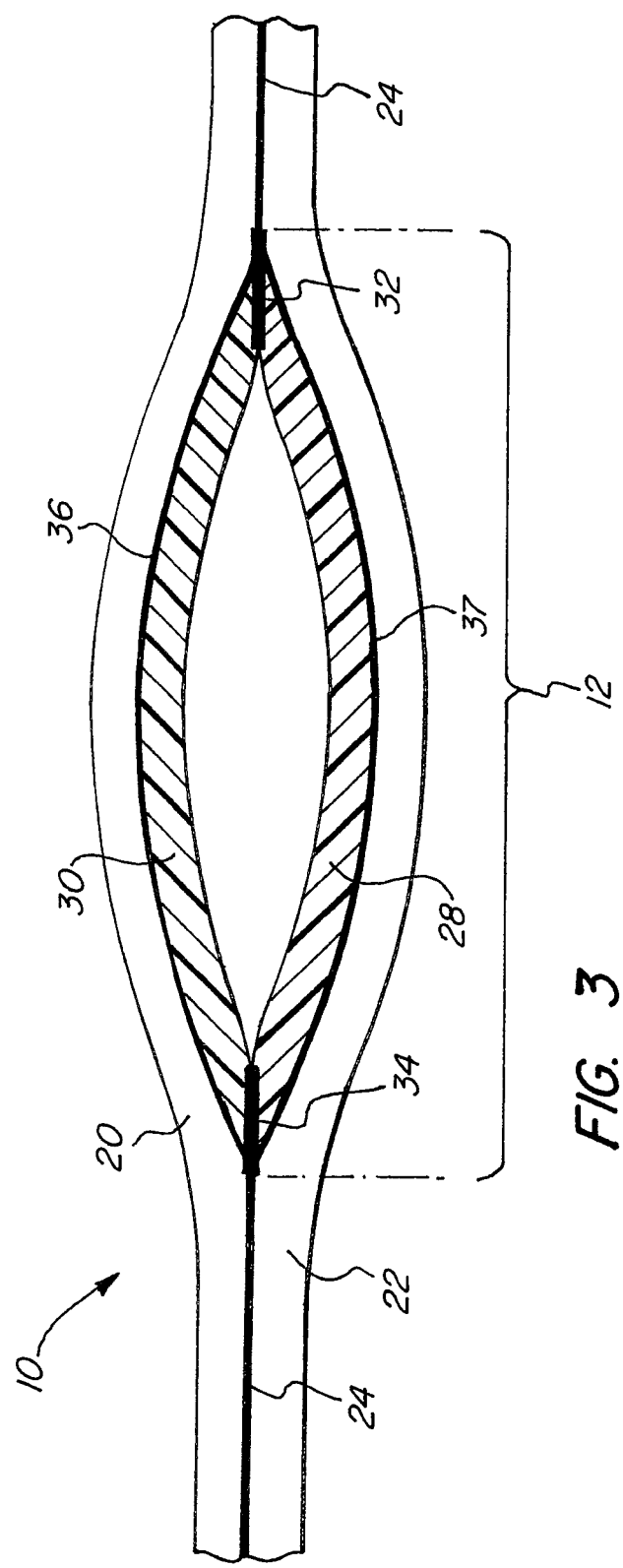
FIG. 3 shows a greatly enlarged schematic cross sectional view of the port opening of an assembled flexible ported pouch of FIG. 2.

In FIG. 2, port 26 is interposed between top pouch sheet 20 and bottom pouch sheet 22 at gap 12. FIG. 3 shows port edge seal 32 and port edge seal 34 between top port sheet 30 and bottom port sheet 28. In the exemplary embodiment in FIG. 4, layer 44 of top port sheet 30 and layer 40 of bottom port sheet 28 are sealed at port edge seals 32 and 34. For instance, these seals may be effected between a temperature of 325-375 degrees F. Other sealable sheets or sealable laminates may be used for port sheets 28 and 30, which may, for instance, have at least one dielectric layer with a sealing affinity between zero to highest, such as a PVC. In other embodiments, if port 26 is formed using a single sheet or laminate folded about an axis, only one seal would need to be effected along the open edge of the folded sheet. In forming the seals, the different sealing parameters may be based on employing various sealing techniques, such as constant temperature, impulse heat sealing, dielectric sealing, and/or ultrasonic sealing.

Top pouch sheet 20, FIG. 2, is sealed to bottom pouch sheet 22 along periphery seal 24 at, for instance, a sealing parameter at a temperature which is lower than that of the temperature for the sealing parameter used to seal port 26 at port edge seals 32 and 34. In FIG. 3, where periphery seal 24 intersects with port 26 at gap 12, seal 36 is formed between top pouch sheet 20 and top port sheet 30 and seal 37 is formed between bottom pouch sheet 22 and bottom port sheet 28. In the exemplary embodiment in FIG. 4, where periphery seal 24 intersects with port 26 at gap 12, seal 36 is formed between top pouch sheet 20 and layer 42 of top port sheet 30 and seal 37 is formed between bottom pouch sheet 22 and layer 38 of bottom port sheet 28. For instance, seals 24, 36, and 37 may be effected at a temperature between 225-275 degrees F. In other embodiments, layer 42 of top port sheet 30 and layer 38 of bottom port sheet 28 may be dielectric layers with sealing affinities between highest to zero, such as polypropylene. This seals the exterior of port 26 to pouch 10 at gap 12 without sealing the interior of port 26 along gap 12. In forming the seals, the sealing parameters may be based on employing various sealing techniques, such as constant temperature, impulse heat sealing, dielectric sealing, and/or ultrasonic sealing.

Figure 5:
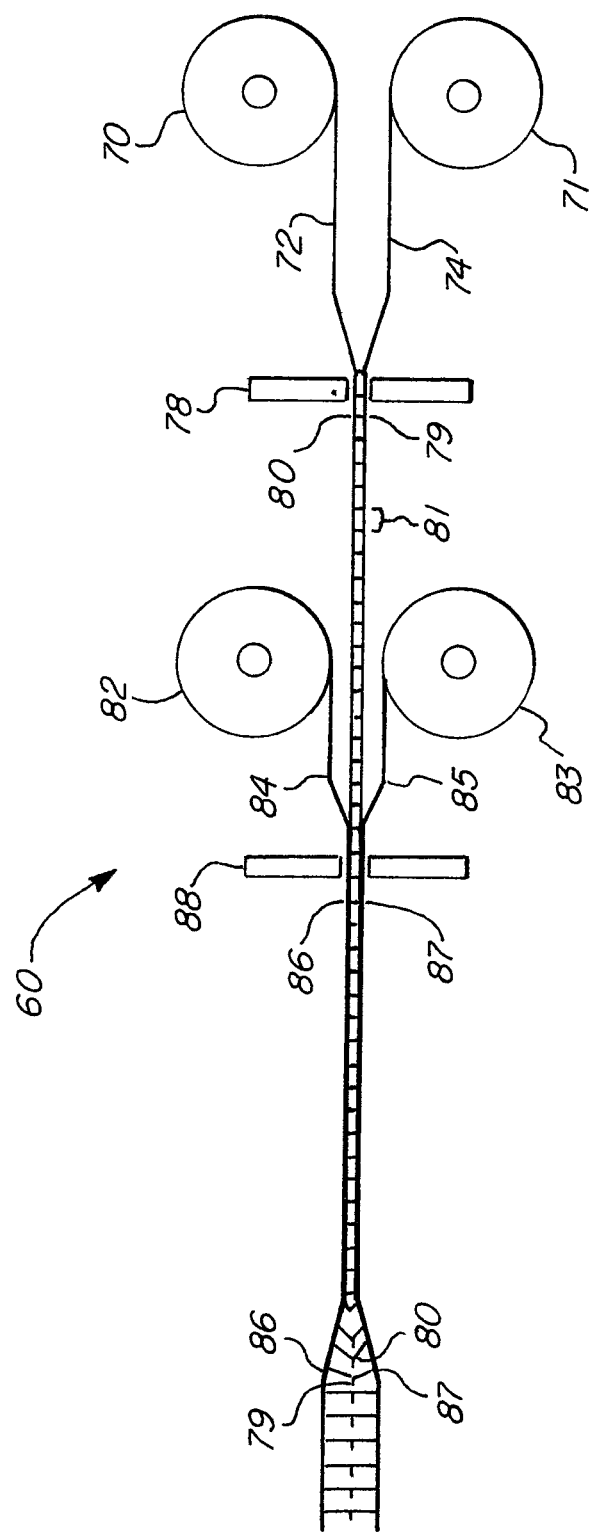
FIG. 5 shows a two dimensional side view of a dual layer film baffle system manufacturing process schematic featuring the multiple layers of sealable material having distinct sealing affinities and multiple seals shown in FIG. 1.
Figure 6:
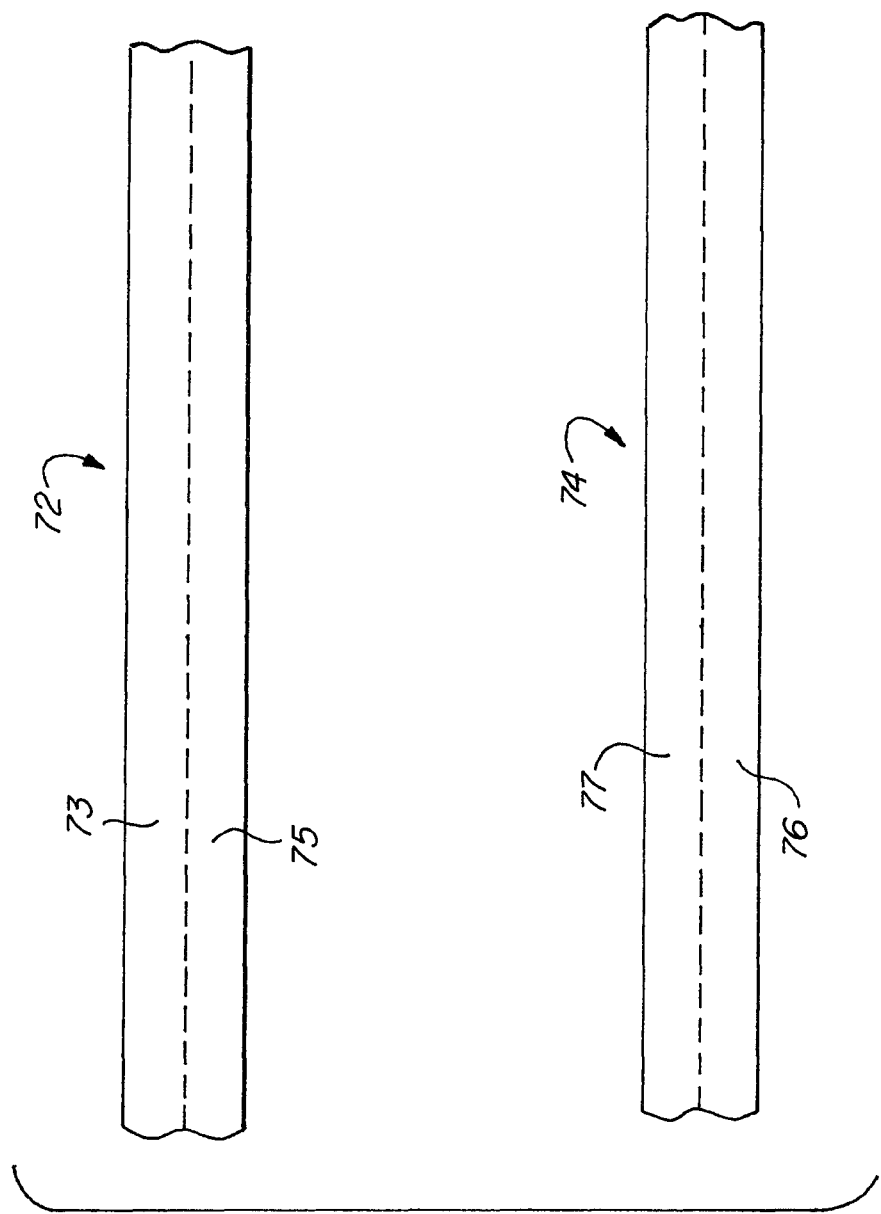
FIG. 6 shows a greatly enlarged schematic two dimensional view of the baffle sheets from the dual layer film baffle system schematic of FIG. 5 as laminates.

The exemplary embodiment of a dual layer film baffle system manufacturing process 60 is shown in FIG. 5. Roll 70 dispenses sealable sheet 72 in parallel with sealable sheet 74 which is dispensed by roll 71. In the exemplary embodiment, sealable sheet 72 and sealable sheet 74, FIG. 6, are laminates. Layers 73 and 76 may correlate to a high or low sealing affinity, or be made of a low temperature sealable material, such as LDPE layers 73 and 76 that are sealable between a temperature of 225-275 degrees F. Layers 77 and 75 may correlate to a high or low sealing affinity, or be made of a high temperature sealable material, such as HDPE layers 77 and 75 that are sealable between a temperature of 325-375 degrees F. In other embodiments, sealable sheet 72 and sealable sheet 74 may have at least one dielectric layer with a sealing affinity between highest to zero. In forming the seals, the sealing parameters correlating to distinct sealing affinities may be based on employing various sealing techniques, such as constant temperature, impulse heat sealing, dielectric sealing, and/or ultrasonic sealing.

Figure 7:
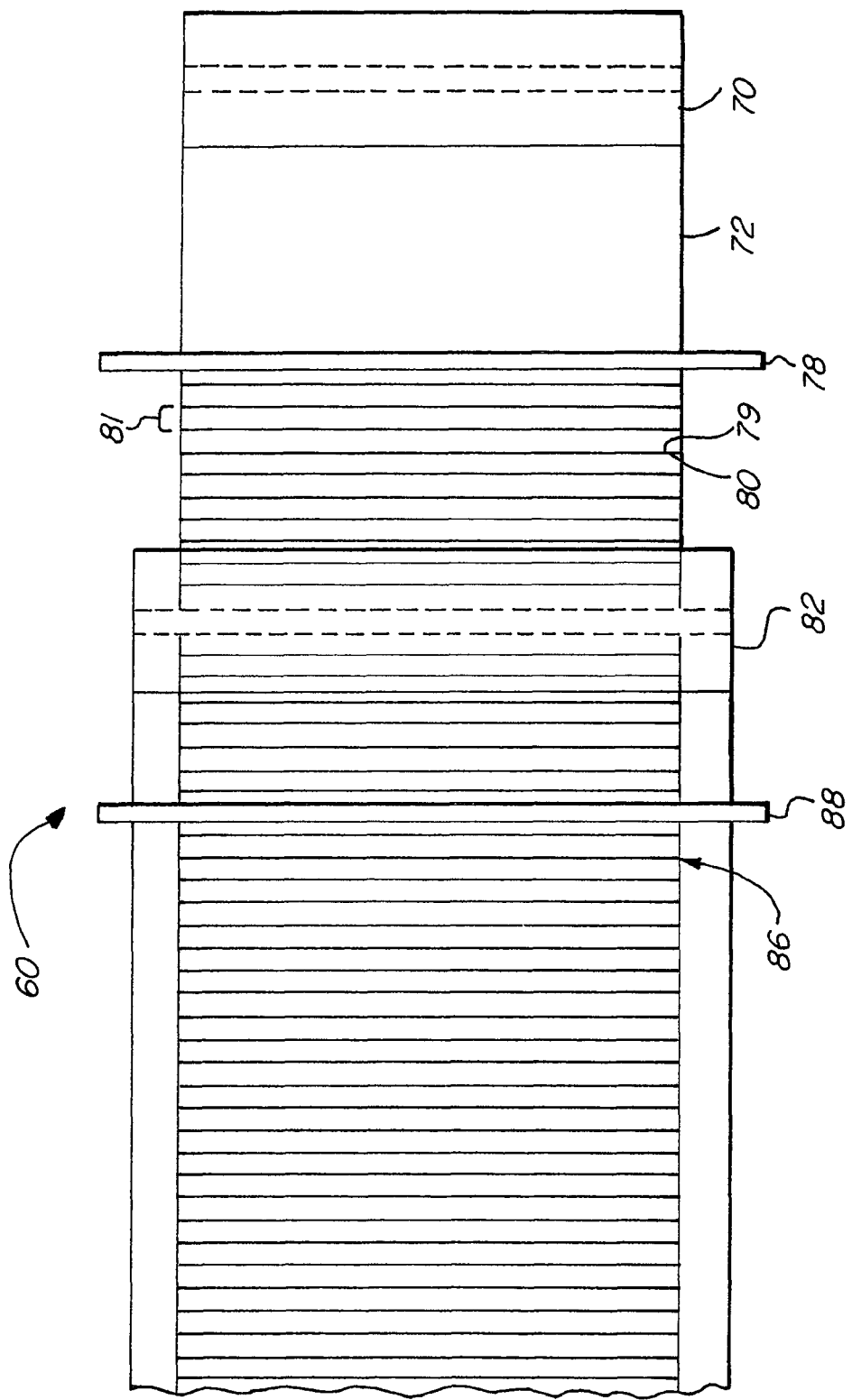
FIG. 7 shows a two dimensional overhead view of the dual layer film baffle system manufacturing process schematic of FIG. 5.
Figure 8:
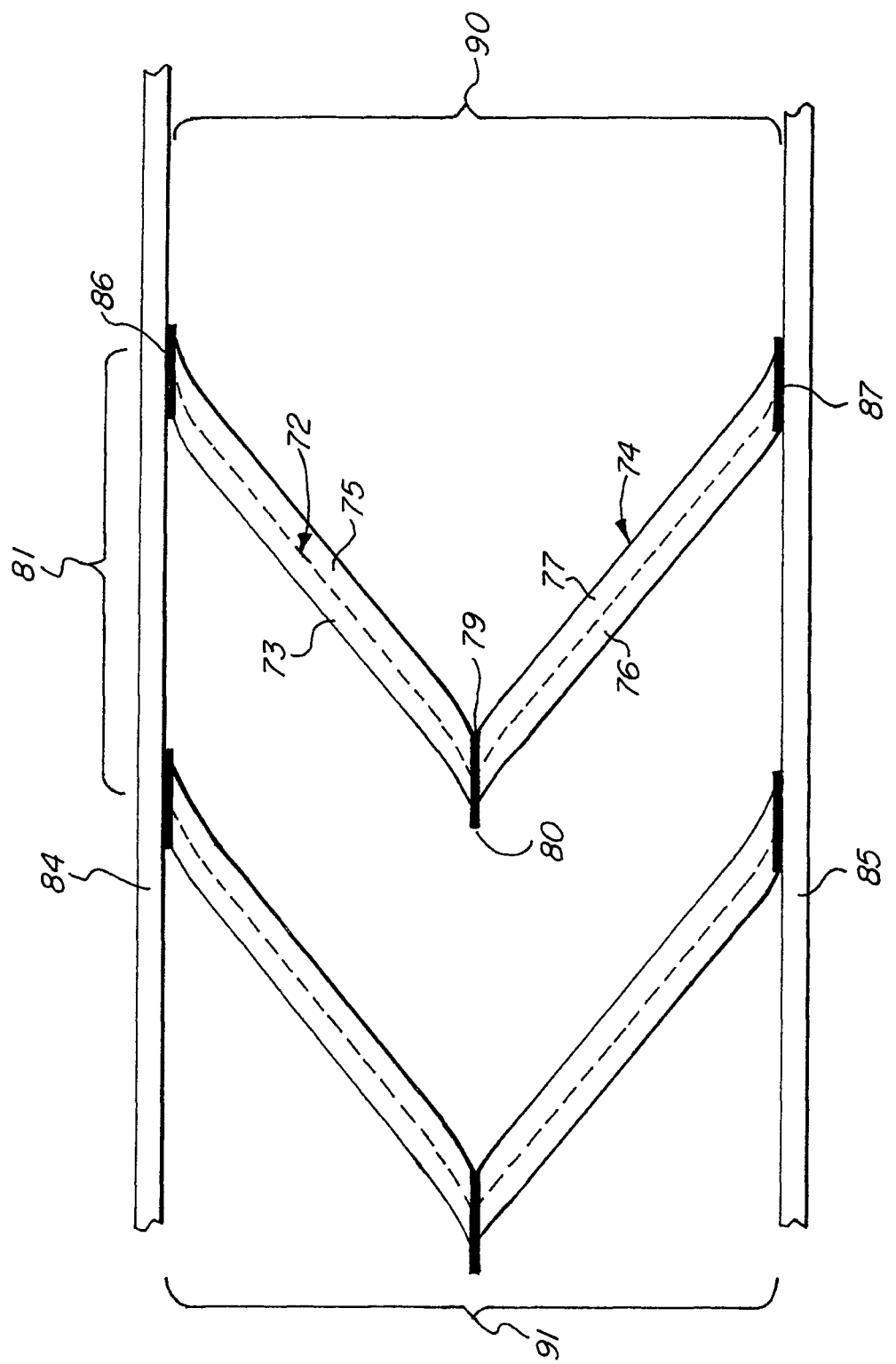
FIG. 8 shows a greatly enlarged schematic two dimensional view of the dual layer film baffle system schematic of FIG. 5 as the exterior sheets are being spread apart.

Sheet 72 and sheet 74, FIG. 5, are brought together at sealing parameter and perforation station 78. At this point, sheet 72 and sheet 74 are affected at a sealing parameter to create seal 79, FIG. 7, latitudinally across the sheets at some interval 81 dependent upon the desired length of baffles 90 and 91, FIG. 8. Interval 81 may, for example, be one inch. Also at station 78, FIG. 5, the now sealed sheets are perforated at interval 81 and immediately preceding seal 79 to create perforated line 80 across the sheets.

Roll 82, FIG. 5, dispenses a sealable sheet, such as low temperature sheet 84, onto sheet 72 while roll 83 dispenses a sealable sheet, such as low temperature sheet 85, onto sheet 74. Sheets 84 and 85 may be made of LDPE and are sealable at a sealing parameter at a temperature of 225-275 degrees F. The sheets are brought together at sealing parameter station 88 where a seal, such as low temperature seal 86, is effected between sheet 84 and 72 and a seal, such as low temperature seal 87, is effected between sheets 85 and 74. These low temperature seals 86 and 87 also cross the sheets latitudinally and are spaced at interval 81. In other embodiments, sheet 84 and sheet 85 may be dielectrics layers having a sealing affinity between highest to zero. In forming the seals, the sealing parameters may be based on employing various sealing techniques, such as constant temperature, impulse heat sealing, dielectric sealing, and/or ultrasonic sealing.

Figure 9:
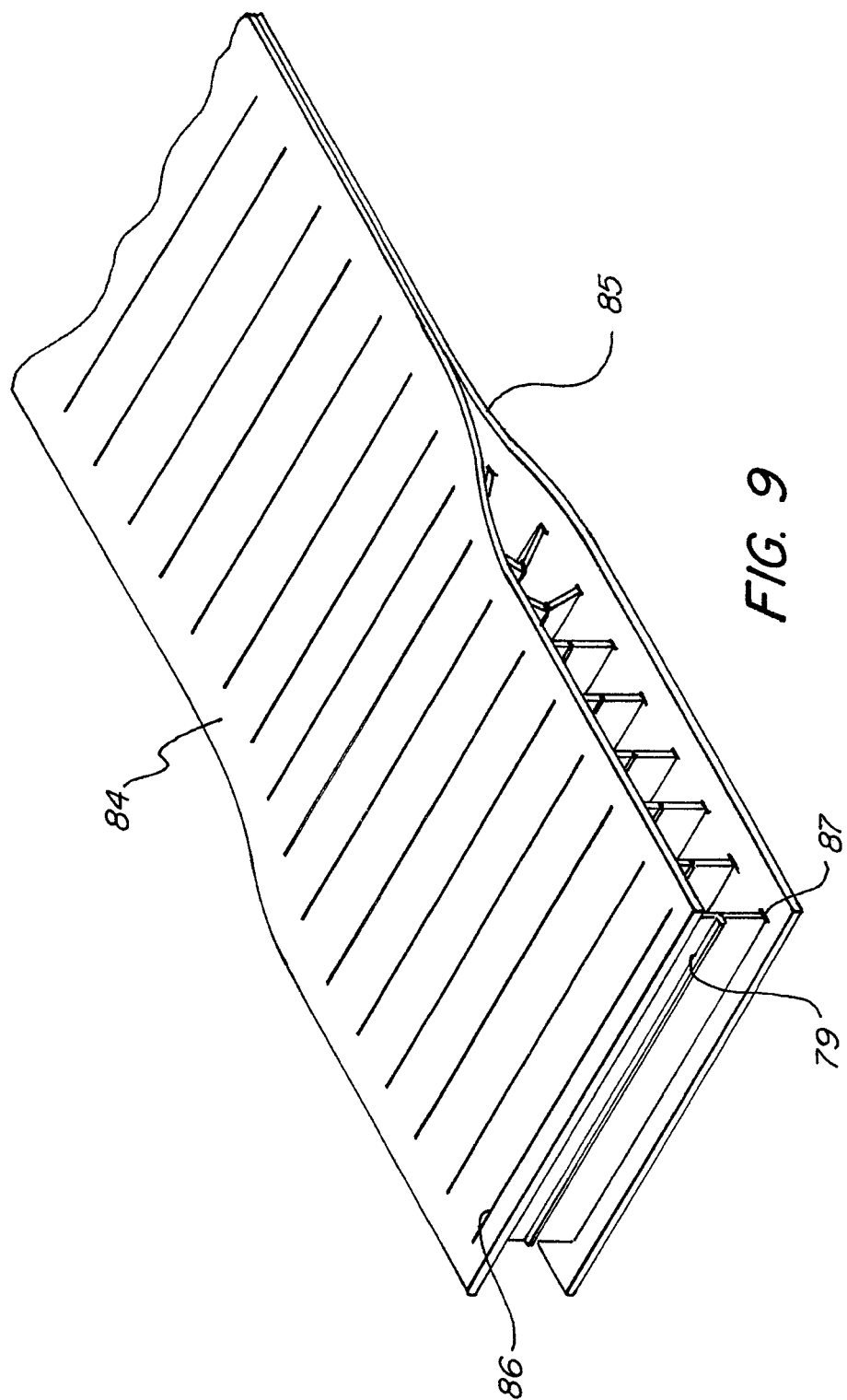
FIG. 9 shows an enlarged perspective view of a finished dual layer film baffle system produced by the manufacturing process of FIG. 5.

Sheets 84 and 85, FIG. 9, are then spread apart. This causes baffle 90, FIG. 8, to separate from baffle 91 at perforated line 80. The end result is a plurality of two piece baffles between sheets 84 and 85. The two pieces of the baffle are joined to each other, for instance, at high temperature seal 79 and joined to sheet 84 and 85 at low temperature seals 86 and 87.

Figure 10:
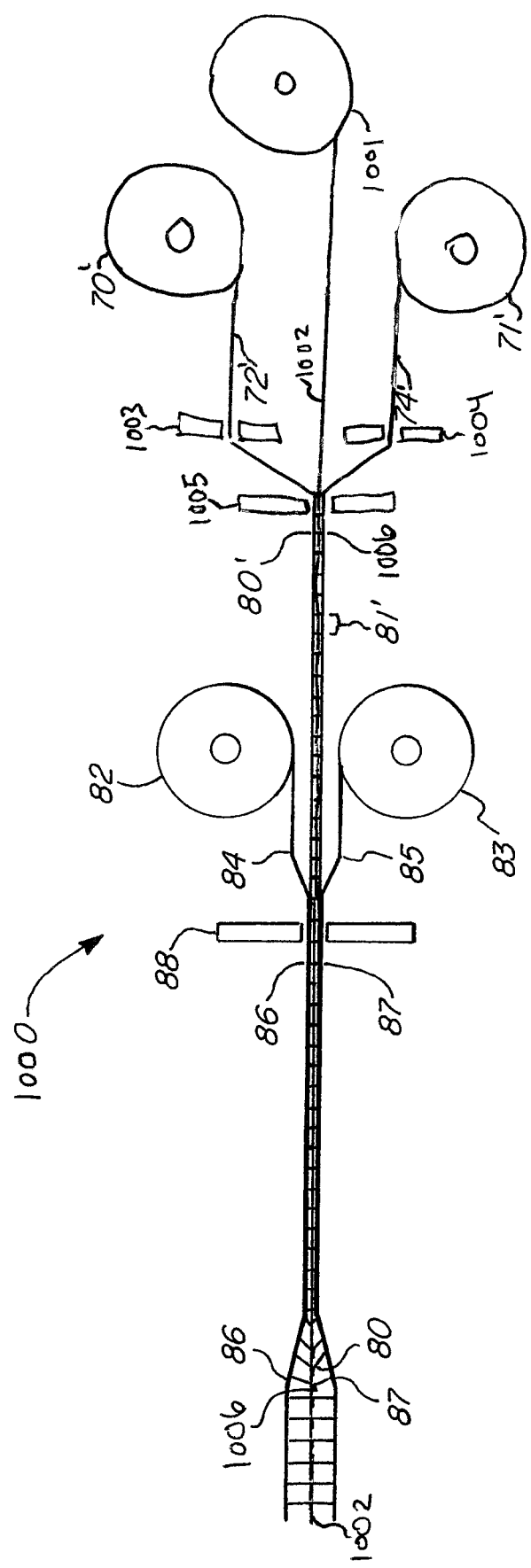
FIG. 10 shows a two dimensional side view of a core film baffle system manufacturing process schematic featuring the multiple layers of sealable material having distinct sealing affinities and multiple seals shown in FIG. 1.
Figure 12:
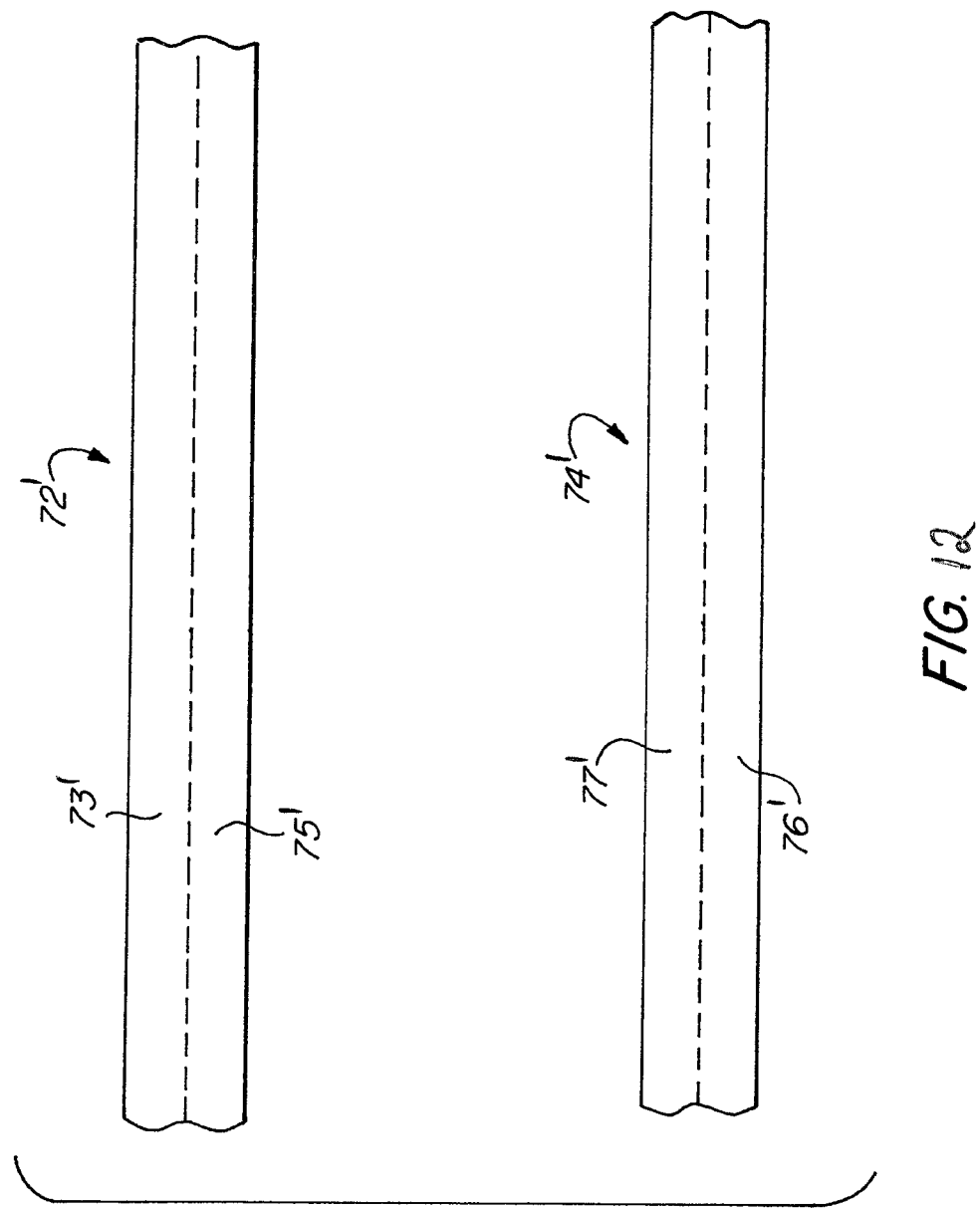
FIG. 12 shows a greatly enlarged schematic two dimensional view of the core film baffle sheets from the core film baffle system schematic of FIG. 10 as laminates.

In an exemplary embodiment of a core film baffle system manufacturing process 1000 is shown in FIG. 10. Roll 70' dispenses sealable sheet 72' in parallel with sealable sheet 74' dispensed by roll 71' and sealable sheet 1002 dispensed by roll 1001. In this exemplary embodiment, sealable sheet 72' and sealable sheet 74', FIG. 12, are laminates. Layers 73' and 76' may correlate to a high or low sealing affinity, or be made of a low temperature sealable material, such as LDPE layers 73' and 76' that are sealable between a temperature of 225-275 degrees F. Layers 77' and 75' may correlate to a high or low sealing affinity, or be made of a high temperature sealable material, such as HDPE layers 77' and 75' that are sealable between a temperature of 325-375 degrees F. In other embodiments, sealable sheets 72', 74', and 1002 may have at least one dielectric layer. In forming the seals, the sealing parameters correlating to distinct sealing affinities may be based on employing various sealing techniques, such as constant temperature, impulse heat sealing, dielectric sealing, and/or ultrasonic sealing.

Roll 82, FIG. 10, dispenses a sealable sheet, such as low temperature sheet 84, onto sheet 72' while roll 83 dispenses a sealable sheet, such as low temperature sheet 85, onto sheet 74'. Sheets 84 and 85 may be made of LDPE and are sealable at a sealing parameter at a temperature of 225-275 degrees F. The sheets are brought together at sealing parameter station 88 where a seal, such as low temperature seal 86, is effected between sheet 84 and 72' and a seal, such as low temperature seal 87, is effected between sheets 85 and 74'. These low temperature seals 86 and 87 also cross the sheets latitudinally and are spaced at interval 81'. In other embodiments, sheet 84 and sheet 85 may be dielectrics layers having a sealing affinity between highest to zero. In forming the seals, the sealing parameters may be based on employing various sealing techniques, such as constant temperature, impulse heat sealing, dielectric sealing, and/or ultrasonic sealing.

Figure 13:
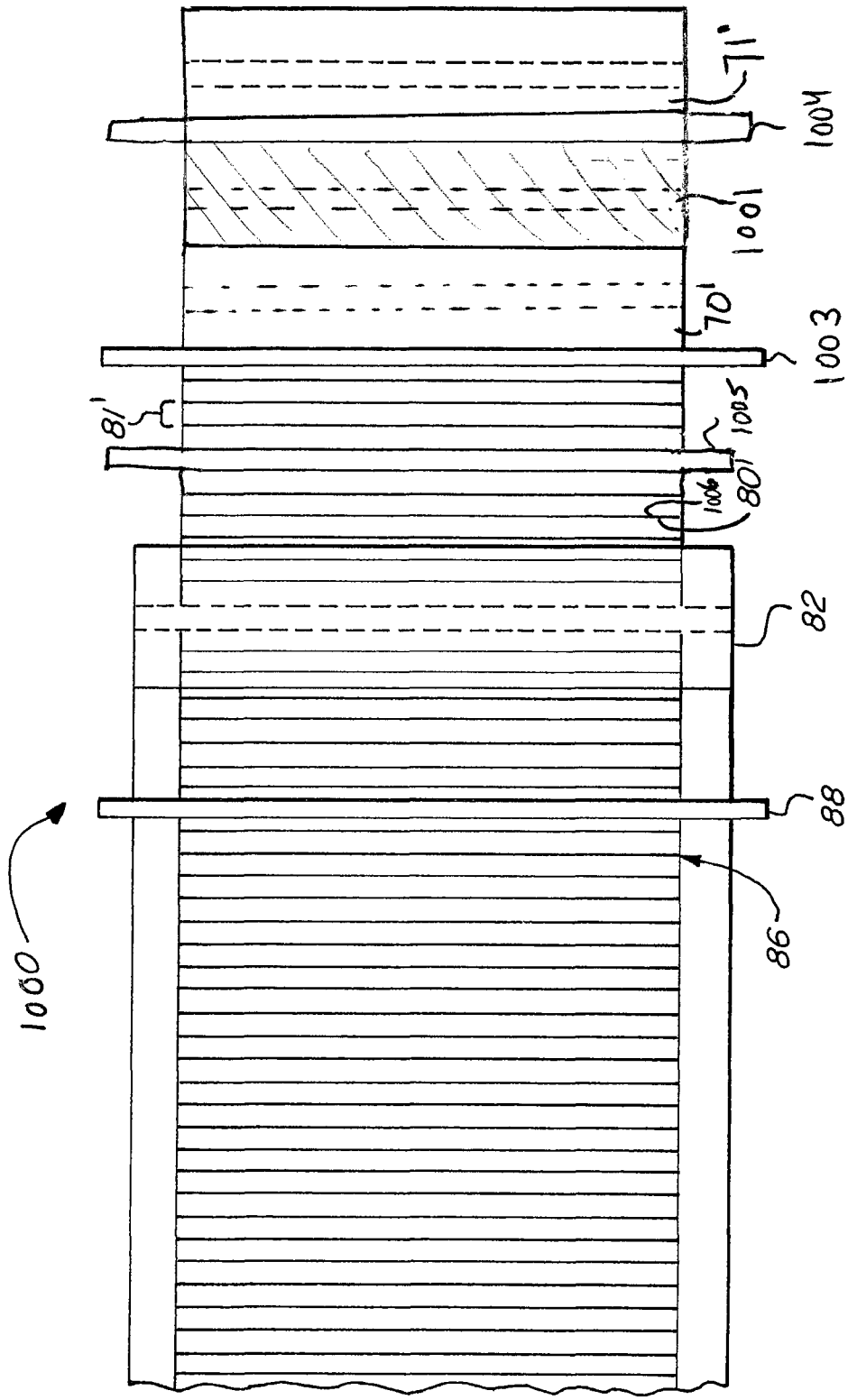
FIG. 13 shows a two dimensional overhead view of the core film baffle system manufacturing process schematic of FIG. 10.
Figure 15:
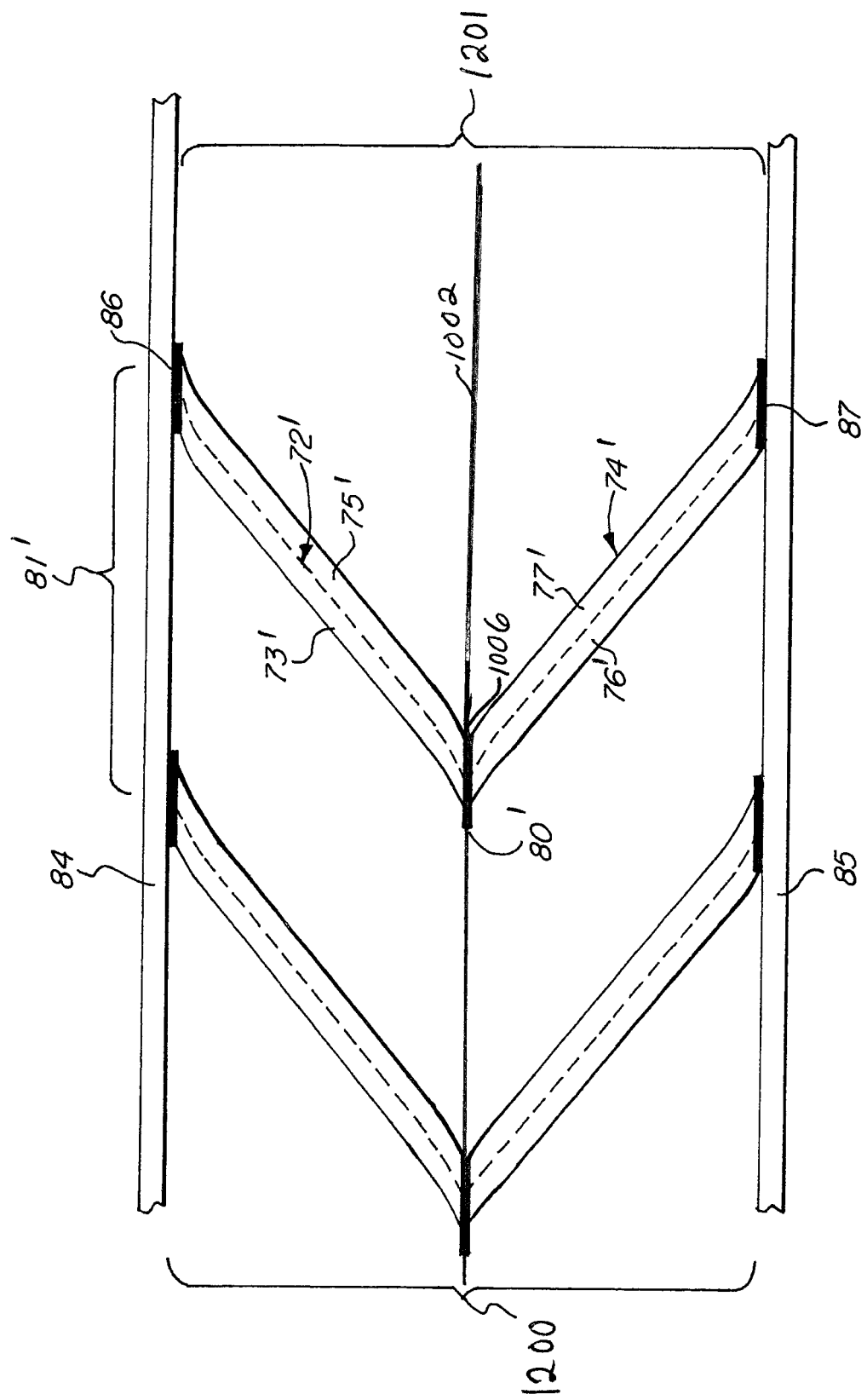
FIG. 15 shows a greatly enlarged schematic two dimensional view of the core film baffle system schematic of FIG. 10 as the exterior sheets are being spread apart.

Sheet 72' and sheet 74', FIG. 10, are perforated latitudinally across the sheets at perforation station 1003 and perforation station 1004, respectively. Also, sheet 72' and sheet 74' are perforated at some interval 81' dependent upon the desired length of core film baffles 1200 and 1201, FIG. 15, to create perforated line 80' across the sheets, FIG. 13. Interval 81' may, for example, be one inch. Sheet 72', sheet 74', and sheet 1002 are brought together at sealing parameter station 1005, FIG. 10, where sheet 1002 is sealed between sheet 72' and sheet 74'. Also at this station 1005, sheet 72', sheet 74', and sheet 1002 are brought together when a sealing parameter is introduced to create seal 1006, FIG. 13, latitudinally across the sheets at interval 81' and immediately following perforated line 80'.

Figure 11:
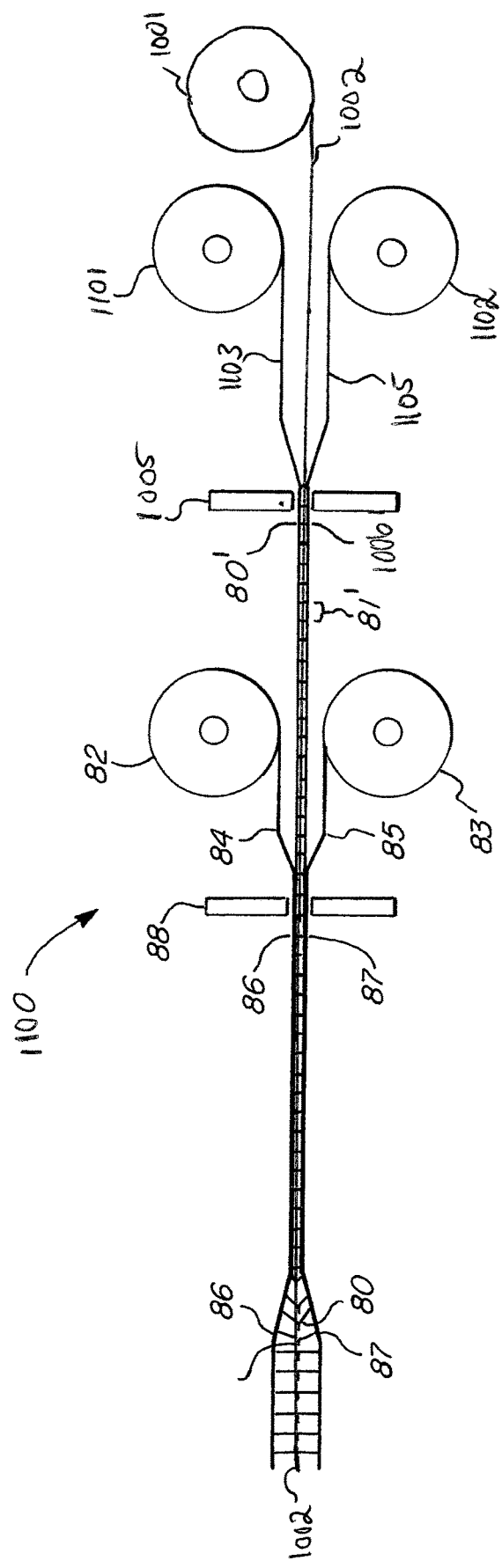
FIG. 11 shows another two dimensional side view of a core film baffle system manufacturing process schematic featuring the multiple layers of sealable material having distinct sealing affinities and multiple seals shown in FIG. 1.
Figure 16:
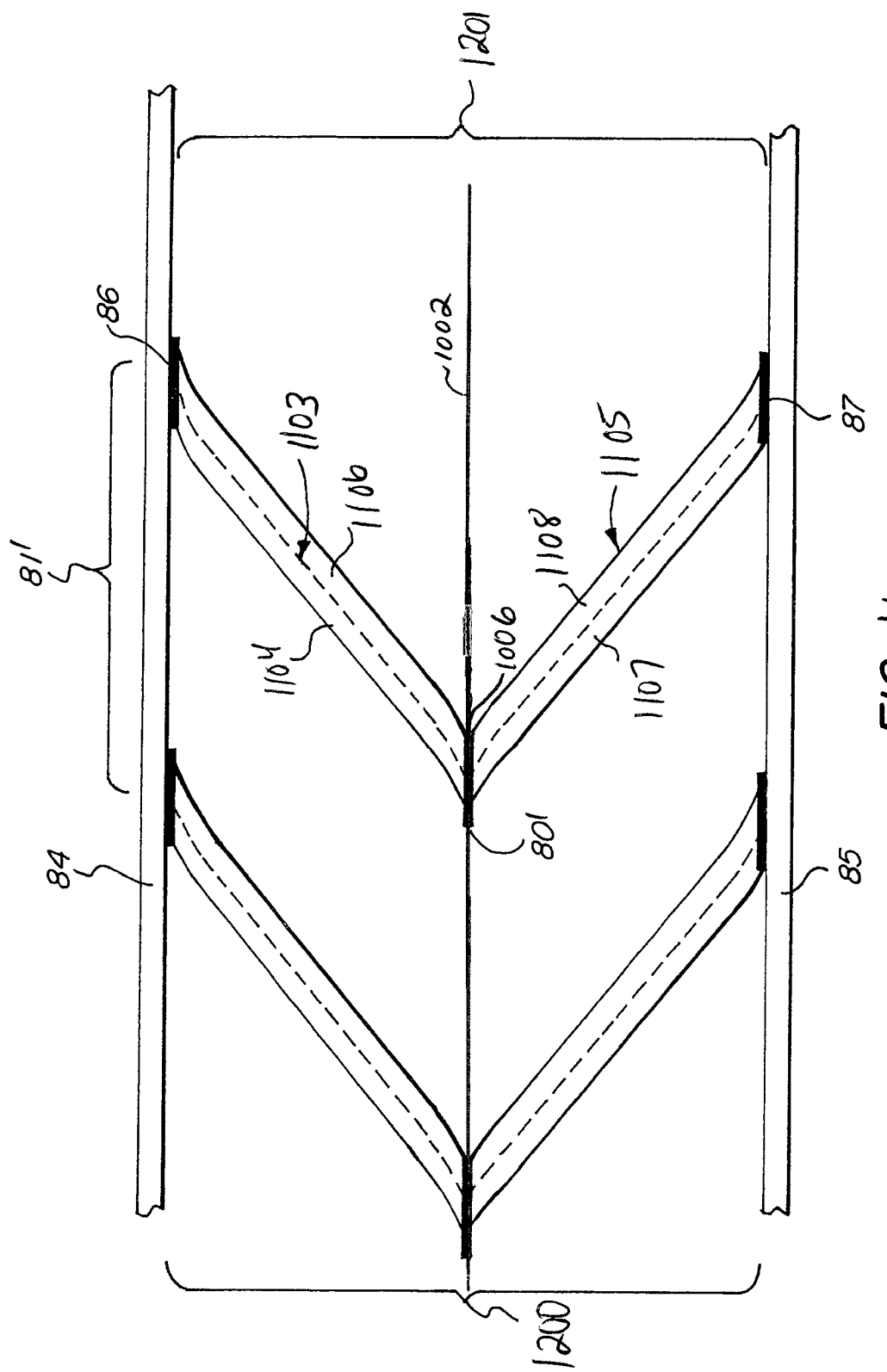
FIG. 16 shows a greatly enlarged schematic two dimensional view of the core film baffle system schematic of FIG. 11 as the exterior sheets are being spread apart.
Figure 17:
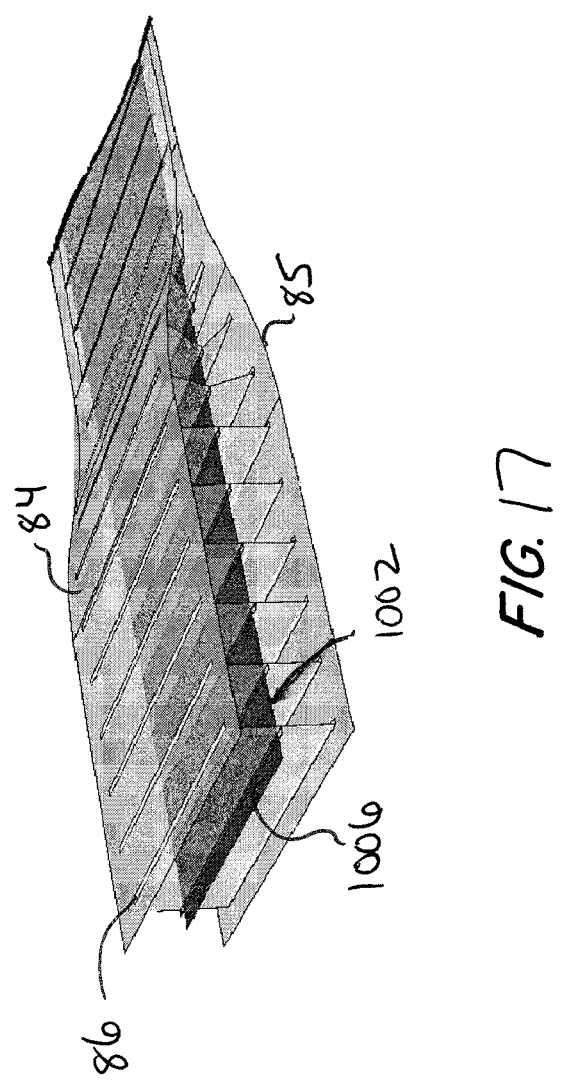
FIG. 17 shows an enlarged perspective view of a finished core film baffle system produced by the manufacturing process of FIG. 10 or FIG. 11.

In another exemplary embodiment of a core film baffle system manufacturing process 1100 is shown in FIG. 11. Roll 1101 dispenses pre-perforated sealable sheet 1103 in parallel with pre-perforated sealable sheet 1105 dispensed by roll 1102 and sealable sheet 1002 dispensed by roll 1001. In this exemplary embodiment, pre-perforated sealable sheet 1103 and pre-perforated sealable sheet 1105, FIG. 16, are laminates. Layers 1104 and 1107 may be made of a high sealing affinity, a low sealing affinity, or a low temperature sealable material, such as LDPE layers that are sealable between a temperature of 225-275 degrees F. Layers 1106 and 1108 may be made of a low sealing affinity, a high sealing affinity, or a high temperature sealable material, such as HDPE layers that are sealable between a temperature of 325-375 degrees F. In other embodiments, sealable sheets 1103, 1105, and 1002 may have at least one dielectric layer. In forming the seals, the sealing parameters correlating to distinct sealing affinities may be based on employing various sealing techniques, such as constant temperature, impulse heat sealing, dielectric sealing, and/or ultrasonic sealing.

Roll 82, FIG. 11, dispenses a sealable sheet, such as low temperature sheet 84, onto pre-perforated sealable sheet 1103 while roll 83 dispenses a sealable sheet, such as low temperature sheet 85, onto pre-perforated sealable sheet 1105. Sheets 84 and 85 may be made of LDPE and are sealable at a sealing parameter at a temperature of 225-275 degrees F. The sheets are brought together at sealing parameter station 88 where a seal, such as low temperature seal 86, is effected between sheet 84 and pre-perforated sealable sheet 1103 and a seal, such as low temperature seal 87, is effected between sheets 85 and pre-perforated sealable sheet 1105. These low temperature seals 86 and 87 also cross the sheets latitudinally and are spaced at interval 81'. In other embodiments, sheet 84 and sheet 85 may be dielectrics layers having a sealing affinity between highest to zero. In forming the seals, the sealing parameters correlating to distinct sealing affinities may be based on employing various sealing techniques, such as constant temperature, impulse heat sealing, dielectric sealing, and/or ultrasonic sealing.

Figure 14:
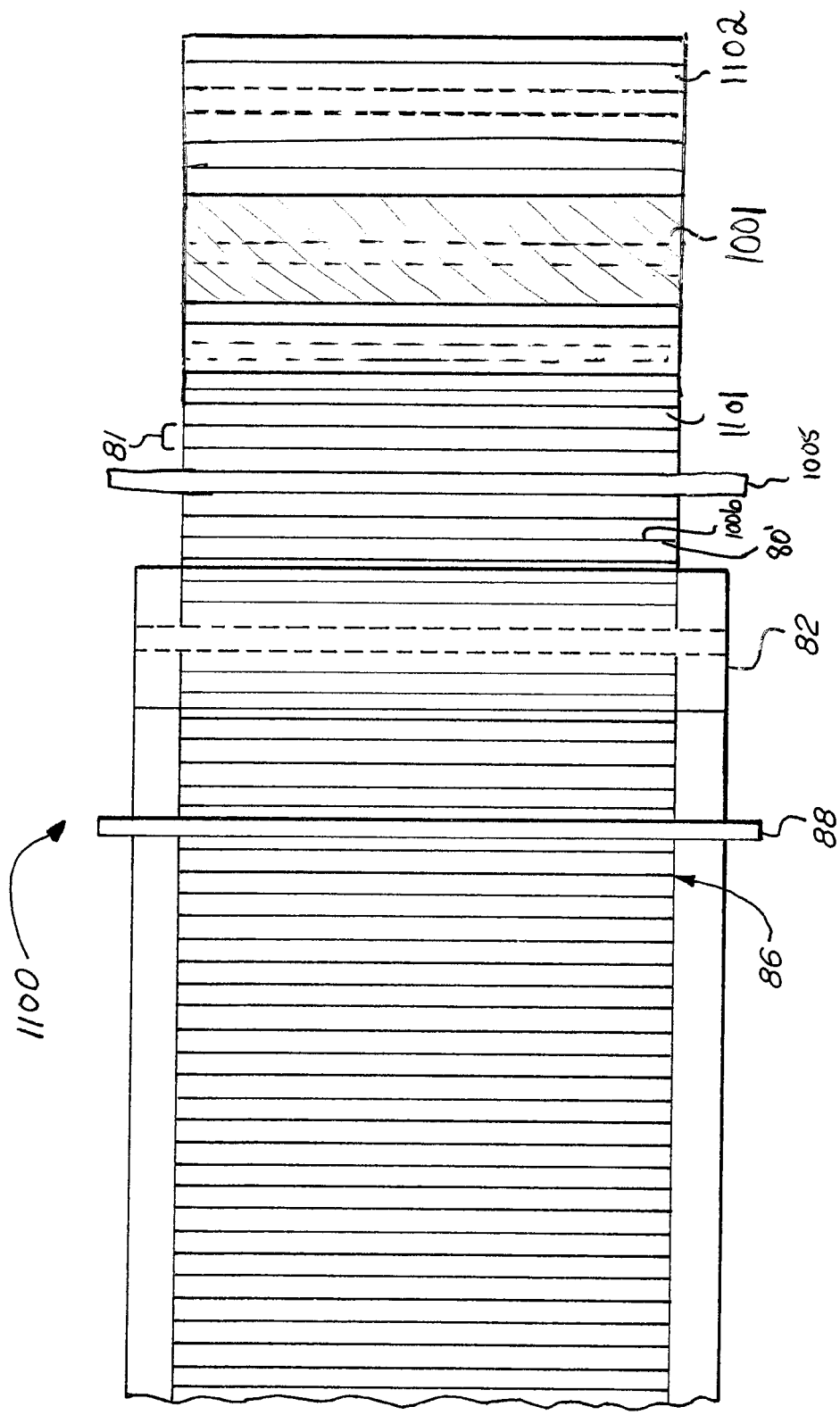
FIG. 14 shows a two dimensional overhead view of the core film baffle system manufacturing process schematic of FIG. 11.

Pre-perforated sealable sheet 1103 and pre-perforated sealable sheet 1105, FIG. 11, have perforations latitudinally across the sheets at some interval 81' dependent upon the desired length of core film baffles 1200 and 1201, FIG. 16, to create perforated line 80' across the sheets, FIG. 14. Interval 81' may, for example, be one inch. Pre-perforated sheet 1103, pre-perforated sheet 1105, and sheet 1002 are brought together at sealing parameter station 1005, FIG. 11, where sheet 1002 is sealed between pre-perforated sheet 1103 and pre-perforated sheet 1105. Also at this station 1005, pre-perforated sheet 1103, pre-perforated sheet 1105, and sheet 1002 are brought together when a sealing parameter is introduced to create seal 1006, FIG. 14, latitudinally across the sheets at interval 81' and immediately following perforated line 80'.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A baffle system comprising:
   a first and second sheet of sealable material;
   a plurality of third sheets of sealable material and a plurality of fourth sheets of sealable material;
   a fifth sheet of sealable material;
   a plurality of core baffle elements interposed between said first and second sheets having a first sealing affinity, said core baffle elements comprising:
   one of the third sheets of sealable material sealed at a first sealing parameter having the first sealing affinity, said third sheet sealed latitudinally across said first sheet and being one of said plurality of core baffle elements; and
   one of the fourth sheets of sealable material sealed at said first sealing parameter having the first sealing affinity, said fourth sheet sealed latitudinally across said second sheet and being one of said plurality of core baffle elements;
   wherein the fifth sheet of sealable material is interposed between the plurality of third sheets and the plurality of fourth sheets, and further sealed to each said third sheet at one of a plurality of locations and at a second sealing parameter wherein said second sealing parameter is at a higher temperature, or correlates to a higher or lower sealing affinity, than said first sealing parameter and the fifth sheet is elongated such the seal at the one of the plurality of locations for a first one of the third sheets is spaced longitudinally from another other one of the plurality of locations for a second one of the third sheets such that the plurality of core baffle elements create a latitudinally oriented passageway between the fifth sheet and two of the third sheets and said first sheet.

2. The core baffle system according to claim 1 wherein the first, second, and third sheets of sealable material are low temperature, low affinity, or high affinity sealing material and the fourth and fifth sheets of sealable material are laminates comprising a first face having the first sealing affinity of high temperature, high affinity, or low affinity sealing material and a second face having the second sealing affinity of low temperature, low affinity, or high affinity sealing material.

3. A baffle system comprising:
a first and second sheet of sealable material extending in a first direction;
a plurality of baffle elements interposed between said first and second sheets along a second axis transverse to said first direction, said plurality of baffle elements comprising a plurality of third sheets and a plurality of fourth sheets of sealable material, for each of the plurality of baffles one of the third sheets and one of the fourth sheets are joined to create a first seal having a first sealing affinity on either side of a fifth sheet and the fifth sheet is elongated such that the first seal for each baffle creates a plurality of first seals between the fifth sheets and different ones of the plurality of third sheets and between different ones of the plurality of fourth sheets;
said third sheet joined to said first sheet to create a second seal;
said fourth sheet joined to said second sheet to create a third seal;
said second and third seals having a sealing affinity different than said first sealing affinity;
said second seal disposed latitudinally across said first sheet and said third seal disposed latitudinally across said second sheet;
said plurality of baffle elements each having first side edges defined between the second and third seals, wherein said first side edges of said plurality of baffle elements align; and
a length of the first sheet measured along the first direction being at least as long as said first side edges.

4. The system of claim 3 wherein the sealing affinity of the second and third seals are the same.

5. The system of claim 3 further comprising a fifth sheet between the third and fourth sheets wherein the third and fourth sheets of each baffle element are joined to the fifth sheet at the first seal, the fifth sheet longitudinally extending between multiple baffle elements and multiple ones of the first seal.

6. The system of claim 3 wherein the third and fourth sheets are each laminated sheets comprising two sides, the first side sealable at a first sealing temperature, the second side sealable at a second sealing temperature.

7. The system of claim 6 wherein the first side is made of LDPE and the second side is made of HDPE.

8. The system of claim 7 wherein the first sides are joined together at the first seal and the second sides are joined to the first and second sheets respectively at the second and third seals.

9. The system of claim 6 wherein the first sides are joined together at the first seal and the second sides are joined at the second and third seals.

10. The system of claim 7 wherein the second sides are joined together at the first seal and the first sides are joined to the first and second sheets respectively at the second and third seals.

11. The system of claim 3 wherein a width of the first seal is less than a width of the first sheet.

12. A baffle system comprising:
a first and second sheet of sealable material extending in a first direction and having a first sealing temperature;
a third sheet of sealable material being selected from the group consisting of: a laminate of two sheets or a coextrusion with two layers having different melting properties or a combination thereof, wherein the selected laminate or the selected coextrusion has the first sealing temperature on one face and a second sealing temperature on a second face;
said third sheet disposed between said first and second sheets and the one face of said third sheet sealed to said first and second sheets at said first sealing temperature such that when said one face is sealed to said first and second sheets at first and second seals and said second face is in contact with itself between the first and second seals, said second face does not seal to itself and is separable from itself to create baffles, said first and second seals being heat seals;
a length of the first sheet measured along the first direction being at least as long as a distance between said first and second seals.

13. The system of claim 12 wherein said third sheet is comprised of two laminate sheets sealed together at their second faces at said second sealing temperature and sealed respectively to the first and second sheets at the first and second seals.

14. The system of claim 12 further comprising a plurality of first seals and a plurality of second seals across the first and second sheets at regularly spaced intervals.

15. The system of claim 14 comprising a plurality of third sheets each having one first seal and on second seal respectively at first and second edges of the third sheet.

16. The system of claim 12 wherein the first sealing temperature is lower than the second sealing temperature.

17. The system of claim 12 wherein a width of the first seal is less than a width of the first sheet.

18. The system of claim 12 further comprising:
a fourth sheet of sealable material being a laminate of two sheets or a coextrusion and having the first sealing temperature on one face and a second sealing temperature on a second face;
said fourth sheet disposed between said first and second sheets and the one face of said fourth sheet sealed to said first and second sheets at said first sealing temperature such that when said one face is sealed to said first and second sheets at first and second seals and said second face is in contact with itself between the first and second seals, said second face does not seal to itself and is separable from itself to create baffles, said first and second seals being heat seals.

19. The system of claim 18 further comprising:
a fifth sheet of sealable material disposed between the third and fourth sheets and having a sealing temperature higher than the first sealing temperature such that the said one faces of the third and fourth sheets seal on opposed sides to the fifth sheet.

20. The system of claim 1 wherein said first, second and fifth sheet extend in a longitudinal direction such that a plurality of sets of the third and fourth sheets make up a plurality of the baffle elements in which at least two of the third sheets and at least two of the fourth sheets are sealed to the fifth sheet and the fifth sheet extends between said at least two of the third sheets and the at least two of the fourth sheets.

\* \* \* \* \*